United States Patent [19]

Wegner et al.

[11] Patent Number: 4,664,013
[45] Date of Patent: May 12, 1987

[54] METHOD AND APPARATUS FOR SETTING THE OPERATING TIME OF A PROJECTILE TIME FUZE

[75] Inventors: Volker Wegner, Binzen; Günter Schultze, Weil am Rhein, both of Fed. Rep. of Germany

[73] Assignee: Deutsch-Französisches Forschungsinstitut Saint-Louis, Saint-Louis, France

[21] Appl. No.: 585,976

[22] Filed: Mar. 5, 1984

[30] Foreign Application Priority Data

Apr. 3, 1983 [DE] Fed. Rep. of Germany ....... 3307785

[51] Int. Cl.⁴ .......................... F42C 17/00; F42C 11/06
[52] U.S. Cl. ........................................ 89/6.5; 102/215
[58] Field of Search ........................... 89/6.5; 102/215; 73/167

[56] References Cited

U.S. PATENT DOCUMENTS

| | | | |
|---|---|---|---|
| 3,228,337 | 1/1966 | Grantham et al. | 102/207 |
| 4,022,102 | 5/1977 | Ettel | 89/6.5 |
| 4,142,442 | 3/1979 | Tuten | 89/6.5 |
| 4,283,989 | 8/1981 | Toulios et al. | 89/6.5 |
| 4,320,704 | 3/1982 | Gowlick et al. | 89/6.5 X |
| 4,480,550 | 11/1984 | Abt | 102/215 |

FOREIGN PATENT DOCUMENTS

| | | |
|---|---|---|
| 0023365 | 2/1981 | European Pat. Off. . |
| 2023938 | 11/1971 | Fed. Rep. of Germany . |
| 2605374 | 2/1979 | Fed. Rep. of Germany . |
| 2800236 | 7/1979 | Fed. Rep. of Germany . |
| 3301251 | 6/1984 | Fed. Rep. of Germany . |
| 3301040 | 7/1984 | Fed. Rep. of Germany . |
| 3309147 | 9/1984 | Fed. Rep. of Germany . |
| 3342934 | 6/1985 | Fed. Rep. of Germany . |
| 3344751 | 6/1985 | Fed. Rep. of Germany . |
| 2304053 | 10/1976 | France . |
| 589838 | 7/1977 | Switzerland . |
| 2042695 | 9/1980 | United Kingdom . |

Primary Examiner—David H. Brown
Attorney, Agent, or Firm—Toren, McGeady and Goldberg

[57] ABSTRACT

Disclosed is a high-acceleration resistant, programmable, electronic time fuze and a method of an apparatus for the correction of the operating time of this time fuze by muzzle velocity measurement carried out inside the projectile or at the gun tube. The time fuze uses the muzzle velocity measured at firing to adjust its operating time. Thus, range dispersion of the event time is substantially reduced. The muzzle velocity is measured with a metal sensitive probe installed inside the projectile. When the probe passes annular grooves in the gun wall, an oscillator is detuned and generates pulses for determination of the projectile muzzle velocity. A bidirectional counter responds to the pulses in one direction, to other information in the other direction and sets off the fuze at a predetermined count such as zero.

16 Claims, 12 Drawing Figures

FIG. 9

METHOD AND APPARATUS FOR SETTING THE OPERATING TIME OF A PROJECTILE TIME FUZE

BACKGROUND OF THE INVENTION

The present invention relates to a method of and an apparatus for setting a projectile time fuse.

The method according to the invention is particularly applicable to high-acceleration resistant, high-accuracy, time fuzes, especially electronic-type time fuzes, or enables the use of these fuzes and improves their accuracy.

The projectile fuze's event times are set at appropriate devices prior to firing, e.g., by programming, on the basis of a number of factors such as the distance to the target.

The time fuzes of the hitherto used mechanical-clockwork type have a relatively low setting accuracy on the order of 50 msec. Thus, event time dispersion is very large, particularly as far as high-velocity projectiles are concerned. Because of this, electronic time fuzes which generally achieve a much higher accuracy are preferred.

The most accurate time fuzes at present are based on the use of crystal clocks that serve as time measuring instruments. Because of their special construction, crystal units withstand acceleration loads to a limit extent only. They are destroyed by acceleration loads of 5,000 to 10,000 g, and change their frequency even at lower accelerations. This results in crystal clocks being used in rocket fuzes only, since the maximum rocket acceleration is only a few thousand g. Projectiles fired from guns are subjected to accelerations of 50,000 g and above. Thus, the installation of crystal clocks into projectiles is not possible. This is one of the reasons why the accuracy of standard projectile time fuzes is quite insufficient; the event time dispersion as related to the firing range is generally larger than 1 percent.

SUMMARY OF THE INVENTION:

Hence, an object of the invention is to improve methods and means for setting fuzes. Another object is to create a method and means which can improve the accuracy of the event time.

According to the invention, this is achieved by measuring the muzzle velocity of the projectile and correcting the fuze operating time by applying the measured muzzle velocity to it.

When using this method, the fuze operating time is preferably selected to be directly proportional to the muzzle velocity measured.

On the whole, a variety of ways and means for determining the muzzle velocity are known. Most of these are not suitable for the operating time correction of time fuzes, because they are not accurate enough. German patent document DE-OS 20 23 938 of the applicant discloses a very accurate method of muzzle velocity measurement which can be advantageously applied to the method of the invention.

The invention has the following advantages: By measuring the muzzle velocity and applying it to the correction of the set fuze time, a major source of error is eliminated. If a fixed fuze operating time is set before firing, the distance traveled until initiation of the projectile main charge may vary significantly from round to round, since the muzzle velocity standard deviation is as large as 1% (assuming a constant temperature). The error due to these variations is often added to faulty temperature measurements. This is a source of error which, by the way, could not be eliminated by the use of highly accurate, e.g. crystal-stabilized clocks, since they are highly accurate in setting and measuring a fixed fuze operating time only. When using the measured value in such a way that the fuze operating time is directly proportional to the muzzle velocity of the projectile, all deviations of the muzzle velocity from the mean value ($\bar{v}_0$) are applied to the fuze operating time and completely compensated for by measuring the projectile velocity at firing.

Measurement of the muzzle velocity inside the projectile is particularly preferred. The main advantage of this method is that no measured values have to be transmitted to the projectile after firing.

An alternative, particularly preferred, embodiment provides measurement of the muzzle velocity at the gun barrel. The main advantage of this method is that costly and sophisticated measuring devices are not lost with the projectile, but can be reused in other projectiles many times.

A particularly preferred embodiment is the measurement of the muzzle velocity with the use of an oscillator the frequency of which is detuned by the projectile flying past a measuring station located inside or in front of the gun tube.

A particularly advantageous measuring method is known from the above-mentioned DE-OS 20 23 938 which should also be referred to with regard to details that are not given in this specification. The measuring method described in DE-OS 20 23 938, though, does not include the installation of the measuring device inside the projectile.

The particularly preferred method of making the correction of the fuze operating time is by wireless radio frequency transmission. In particular, this has the advantage that the measuring basis or components thereof can be located at the gun tube, and that secure transmission is nevertheless guaranteed.

In accordance with a particular aspect of the invention, the radio frequency transmission used for correcting the fuze operating time is also employed for setting the fuze prior to firing. Present methods of programming electronic time fuzes prior to firing use an electric contact between the projectile and the data line of the fire control computer. Data are fed via the firing knob of the electrical primer. However, this well-known method poses great safety problems.

The tansmission of the measured value via an optical relay connection is alternatively preferred. This exhibits the aforementioned advantages of the radio frequency transmission, and is particularly advantageous in cases where radio-frequency interference may occur. In accordance with another aspect of the invention, this method may also be used for the time setting of the fuze prior to firing.

A particularly preferred measuring and correcting apparatus is a bidirectional counter used in combination with an adjustable frequency divider. This apparatus can substantially improve the accuracy of the time fuze, since a complete compensation for all systematic errors in the clock signal generator frequency is achieved. The accuracy of the event time with respect to the firing range can be improved by a power of ten. Then the dispersion is only 1 to 2 per mil of the range.

With the use of the adjustable frequency divider, the fuze can be preset on the basis of the individual characteristics of the short, the target range in particular.

Another advantage of the method and apparatus in accordance with the invention results from the fact that the zero point for time measurement can be fixed exactly because of the projectile passage or movement of the probe relative to the measuring basis. In previous methods using the ignition process of the propelling charge, the statistical variations of the ignition delays resulted in the disperion of the point of initiation. When acceleration switches are used, the different acceleration curve courses as well as the switch tolerances have an effect on that dispersion.

In addition to the above-mentioned, the invention provides an apparatus for setting a projectile time fuze. This apparatus is used in particular for carrying out the method specified in this patent application. The apparatus is cnaracterized by means for measuring the muzzle velocity of the projectile and by a device for correcting the fuze operating time with respect to the muzzle velocity measured. The advantages of such a solution are apparent from the description of the advantages of the corresponding method.

The preferred location of the means for measuring the muzzle velocity inside the projectile. In particular, this has the advantage that no data have to be transmitted to the projectile after firing.

An alternatively preferred embodiment of the apparatus includes the means for measuring the muzzle velocity being located at the gun barrel, at least partially. In particular, this has the advantage that components of the costly measuring device are reusable.

Preferably, the measuring device is fitted with an oscillator which is located such that its frequency is detuned to a large extent by the projectile traveling along the gun tube.

For this purpose, the arrangement known from DE-OS 20 23 938 and further described in the following can be used, the advantages of which have already been stated.

Preferably, the apparatus is equipped with a measuring base or station located inside or in front of the gun barrel. This measuring station detunes the oscillator frequency as the projectile travels along the station. On the basis of the (given, known) length of the measuring station and of the time interval of the signals generated by detuning, the muzzle velocity can be determined and used advantageously for the correction of the fuze operating time.

Preferably, the measuring station is fitted with one or two annular grooves located in the gun barrel wall. These grooves can be easily cut and their spacing from each other or from corresponding edges can be accurately fixed, so that an especially accurate measuring station will be achieved.

Alternatively, a measuring station with one or two annular grooves located in front of the gun barrel, the measuring station preferably being securely connected with the gun barrel. Such a solution has the advantage that no modifications of the gun barrel are required. Furthermore, acceleration is even nearer completion in front of the gun barrel, so that a nearly final velocity value can be determined. The secure but, if required, separable connection ensures that accurate measurements to be obtained at all times.

Preferably, the apparatus comprises a device for wireless transmission of the measured value for correcting the fuze operating time via radio frequency. The advantages of such a device are as stated above. In particular, this device can be used at an early stage for the transmission of data inputs prior to firing.

Preferably, the apparatus comprises a optical relay coupling or optical coupling for the transmission of the measured value. Such a coupling can also be used for the input of data prior to firing, presenting the intrinsic advantages as described at the beginning.

The device being equipped with a bidirectional counter in combination with an adjustable frequency divider is particularly preferred. By use of the bidirectional counter, systematic errors can be avoided, a value in proportion to the muzzle velocity can be recorded reliably and in a way to be easily utilized, and with the use of the adjustable frequency divider, the value pertaining to the respective range can be applied and set without difficulty.

The invention, both as to its construction and its method of operation, will be best understood from the following description of specific embodiments when read in connection with the accompanying drawings, which are referred to in particular with regard to the disclosure.

DETAILED DESCRIPTION OF PREFERRED EMBODIMENTS

Figure 1:
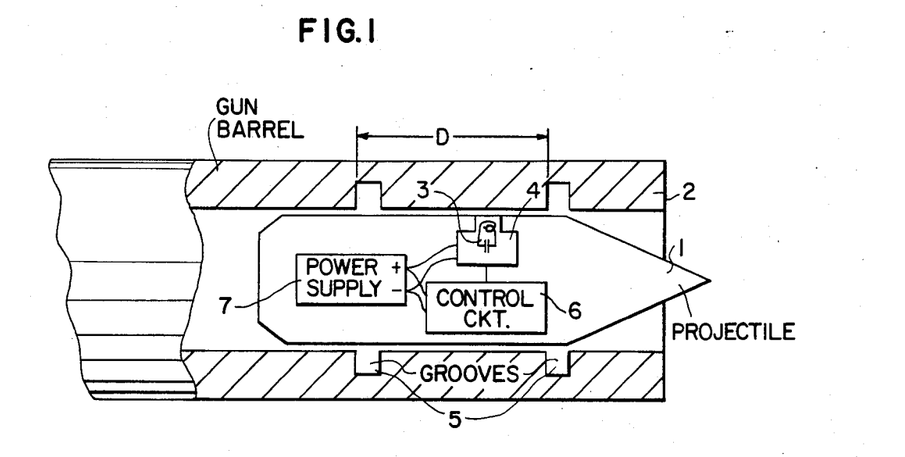
FIG. 1 shows the arrangement of the different components, the invention being used with a full bore projectile.
Figure 2:
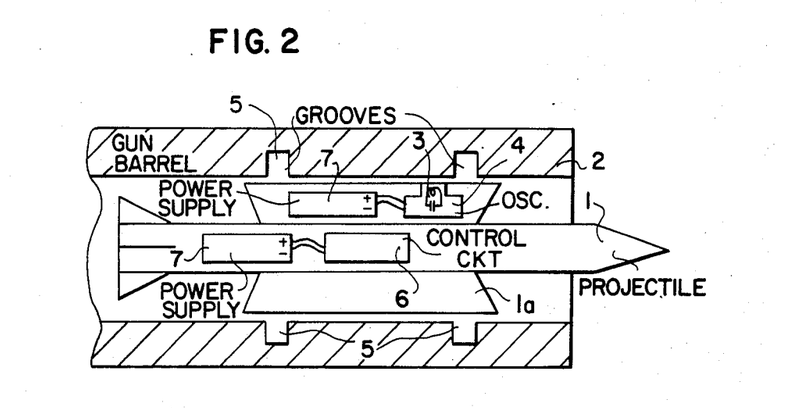
FIG. 2 shows the arrangement of the different components, the invention being used with a subcaliber projectile with sabot.

In FIG. 1 and 2, a projectile 1 is illustrated in its passage from its initial position (at the far left of that shown and) in the breech of a gun barrel 2, to the muzzle at the right end of the barrel 2. A measuring station is composed of two annular grooves 5 spaced a distance D on the inner wall of a gun barrel 2. According to an embodiment of the invention the measuring station is composed of a simple annular groove and the gun muzzle. According to yet another embodiment of the invention an additional measuring station is located in front of the muzzle gun barrel.

A probe 3, 4 is located inside the projectile or barrel in this case. The probe 3, 4 includes a coil 3 of an RF oscillator 4. The coil 3 is located directly at the interface of gun barrel and case of the projectile. The oscillator 4, together with the coil 3, is installed into an adapter housing which is screwed into a cavity in the case of the projectile. According to another embodiment of the invention the adapter housing is located inside the gun barrel. The frequency of the oscillator 4 varies (see FIG. 3) depending on whether there is metal above the upper side of the coil or not. The absolute frequency value of the oscillator can be freely selected. If there is a metal surface above the coil, the oscillator frequency is higher than it is in the air or with a plastic surface above the coil. The adaptor housing also includes a control circuit 6 and a power source 7.

Figure 3A:
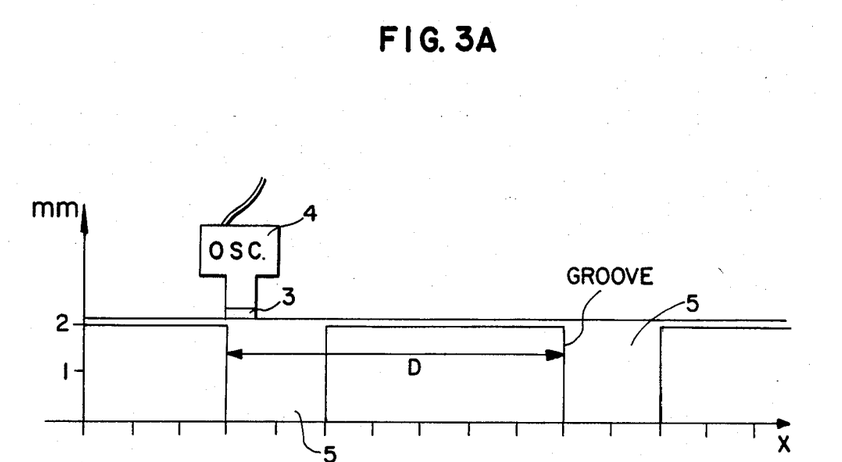
FIG. 3A and 3B show the relationship between the measuring station shape and the oscillator frequency of the probe, according to the invention.
Figure 3B:
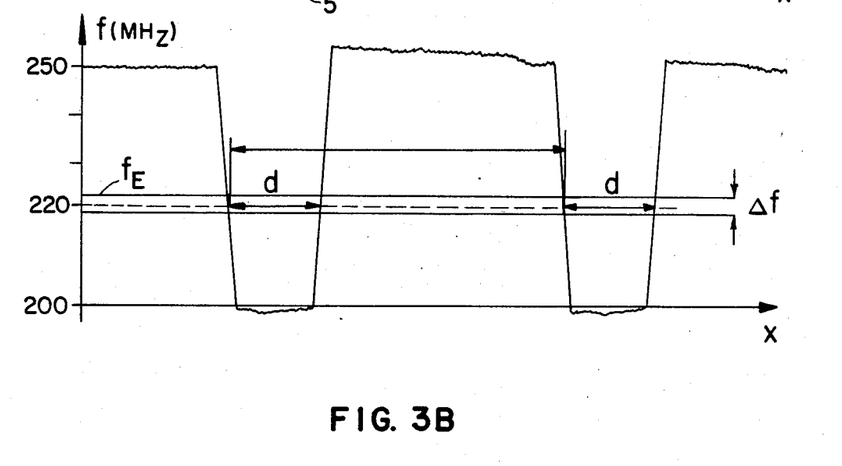
Figure 4:
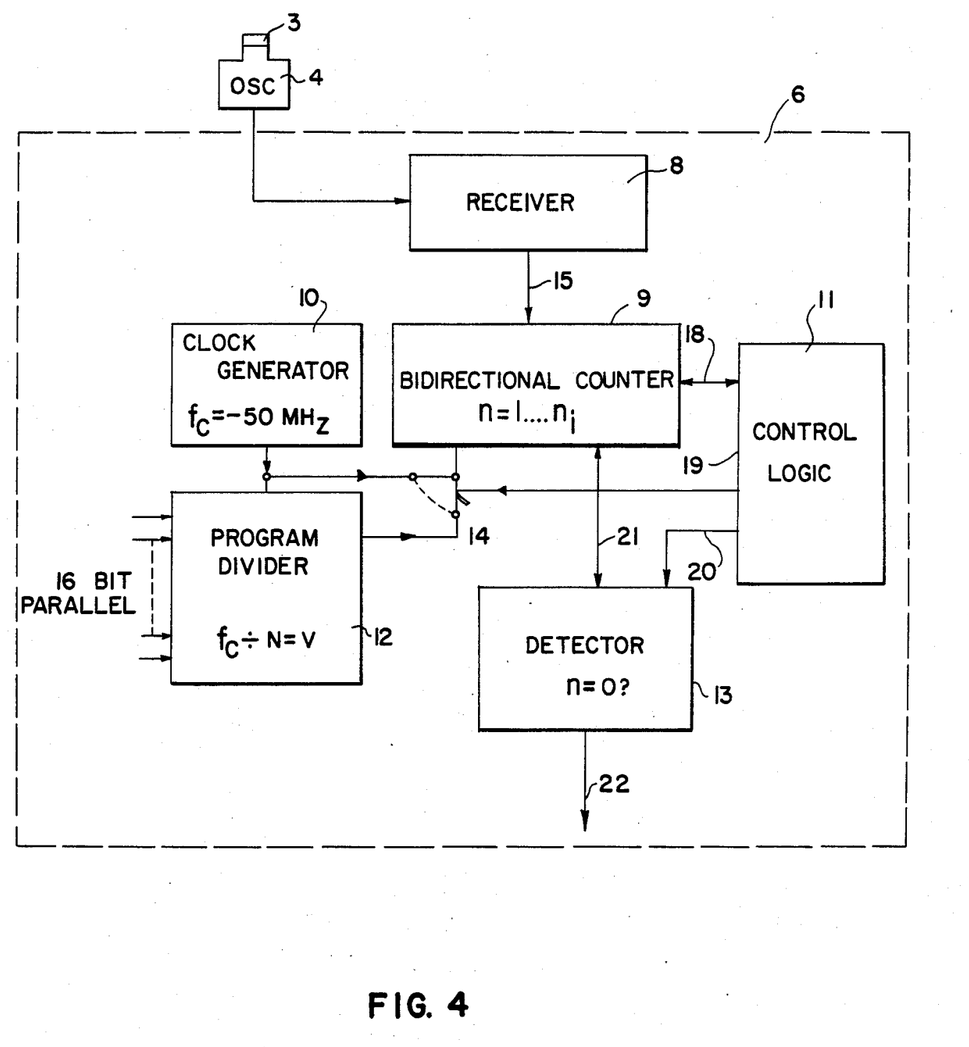
FIG. 4 shows a block diagram of an electronic fuze with operating time correction achieved by measuring the muzzle velocity.

At firing, the probe which is located inside the projectile moves past grooves 5 of the measuring station in the gun barrel. During passages of the groove edges, the oscillator circuit frequency changes. This frequency change is within the range of 40 to 50 MHz for the experimental models tested. As shown in FIG. 4, the oscillator 4 supplies its RF output signal to the circuit 6. In the circuit 6, the RF signal is fed to a narrow band receiver 8 ($\Delta f = 1$ MHz) whose receiving frequency $f_E$ is adjusted to a value between the two extremes (FIGS. 3A and 3B). Because of the narrow band width, the projectile position is determined with great accuracy. FIG. 3A shows the coil 3 passing the grooves 5. FIG. 3B shows the frequency changes resulting from the effect of the grooves 5 on the coil 3 and oscillation 4 as the coil 3 progresses in the direction x. The receiver 8 is turned to the frequency 220 MHz as the frequency of oscillation 4 varies from 250 MHz to 200 MHz and back.

A frequency change such as 40 MHz applies to a distance of 4 mm for the embodiments tested. For a receiver band width of $\Delta f = 1$ MHz, this results in a local resolution of $\Delta D = 4$ mm/$40 = 0.1$ mm. For a measuring station lens of $D > 10$ cm, the resolution is $\Delta D/D < 1$ per mil. The output side of the receiver is fitted with a rectifier generating pulses at those instants when the probe passes the edge of a groove.

The projectile velocity can be determined from the intervals between the individual pulses.

As shown in FIG. 4, the pulses are used for the fuze operating time correction as follows:

The first pulse generated by the receiver on a line 15 at the beginning of the measuring station starts count-up in a bidirectional counter 9. A clock signal generator 10 with a very high frequency $f_c$ provides pulses to the counter a which counts approximately 1,000 pulses during count-up. As soon as the probe 3, 4 passes the end of the measuring station (second groove 5 or the muzzle), a stop pulse that ends the count-up is generated. Control logic 11 now uses the line 18 to set the counter to countdown, and at the same time, a divided frequency fd is fed to the counter 9 by an electronic switch 14. The divided frequency fd required for countdown is generated by an adjustable, e.g., programmable frequency divider 12 with a division ratio depending upon the time of flight (and, thus, upon the range). At zero count, a fuze firing pulse is generated. This is accomplished by the control logic 11 using a line 20 to cause a detector 13 to interrogate the condition of the counter 9 via a line 21, and to produce the firing pulse on a line 22 when the count is zero.

Example: The counter is assumed to have counter 1,000 pulses in countup.

Frequency for countdown: $\nu = 1,000$ Hz.

Hence, the counter "zero" is reached after 1 sec.

This method has the following effects and advantages:

At a constant frequency of the clock signal generator during projectile flight, there is a linear relationship between the event time and the time of projectile passage along the measuring station.

At a lower projectile velocity, more pulses are counted, so that the time required for the countdown to zero is prolonged. This is the next compensation for the projectile time of flight prolongation at lower muzzle velocities. For higher projectile velocities, the time until initiation of the projectile charge is shortened accordingly.

The frequency divider is set, e.g. programmed, by the fire control computer. The division ratio N results from the mean time of flight of the projectile at the respective range (=initiation range) as follows:

$$\frac{T_F(x)}{n} = \frac{1}{\nu(x)}$$

$$N(x) = \frac{f_c}{\nu(x)} = \frac{T_F(x)}{n} \cdot f_c$$

where
  x = firing range;
  $T_F$ = (mean) time of projectile flight;
  n = number of pulses in counter at mean MV ($\bar{v}_0$);
  $\nu$ = countdown frequency;
  $f_c$ = undivided frequency of clock signal generator (count-up frequency);
  N = division ratio.

Because of the 1,000 pulse counted in count-up, the inaccuracy of the event time with respect to the firing range is within 1 to 2 per mil only.

The accuracy of the method is dependent mainly upon the number of clock pulses counted in count-up. The larger their number n, the greater the accuracy of the fuze. The number n is dependent upon the length D of the measuring station and the frequency $f_c$.

The stability requirements for the clock signal generator frequency are only minor and easy to meet. During projectile flight only, the clock signal generator frequency has to meet the stability requirement give by:

$$\frac{\Delta f_c}{f_c} < 10^{-4}$$

The frequency $f_c$ can vary largely (several per cent) from projectile to projectile without any influence on the accuracy of the fuze.

Frequency changes due to temperature are also of minor importance, as long as the temperature in the vicinity of the clock signal generator inside the fuze remains constant from the time the projectile leaves the muzzle to the time of initiation.

Slightly modified, the method and the apparatus can be used with the same electronic fuze, the MV probe being located at the gun tube instead of inside the projectile, and the projectile being used as the measuring basis.

In this case, the measured value has to be transmitted to the projectile via a wireless radio or an optronic data transmission line.

The setting or programming of the frequency divider located inside the projectile can be carried out in one of the following ways.

Figure 5A:
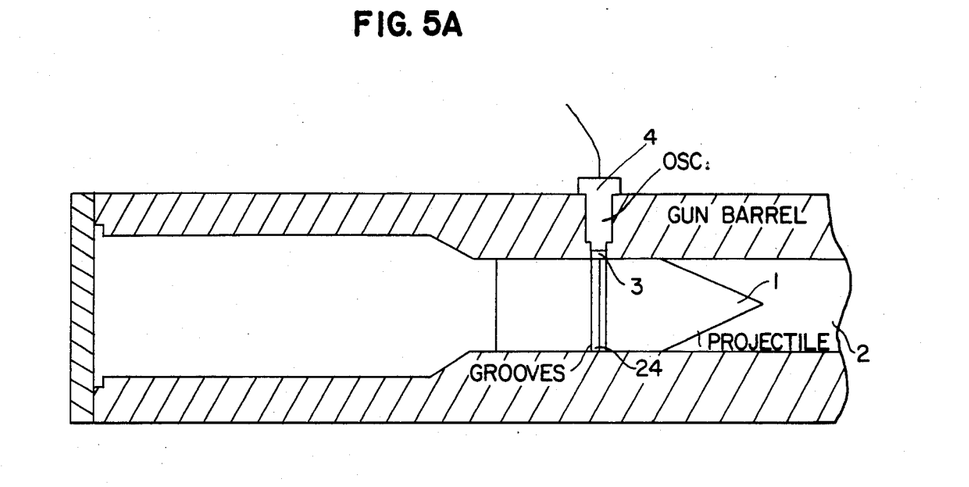
FIGS. 5A and 5B show two means for setting or programming of the fuze inside the gun tube.
Figure 5B:
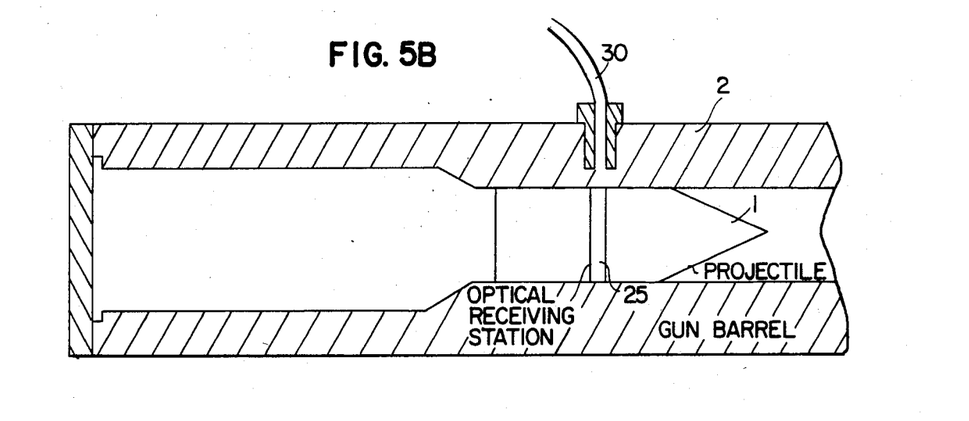
Figure 6A:
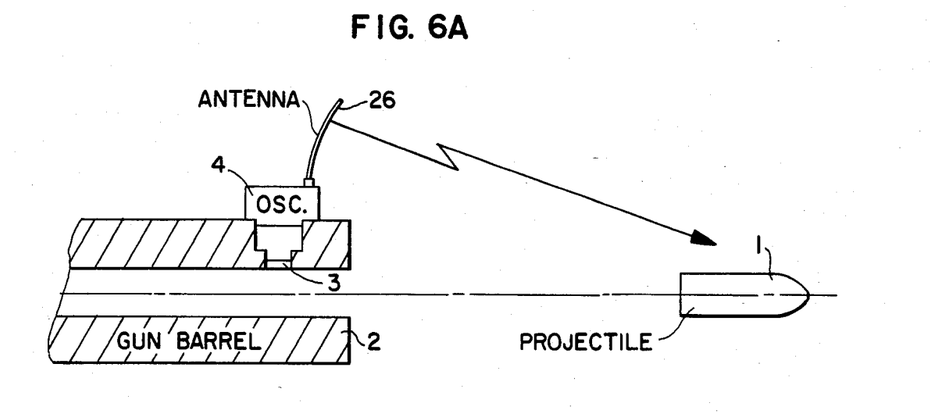
FIGS. 6A and 6B show two means for setting or programming of the fuze and operating time correction along the projectile trajectory.
Figure 6B:
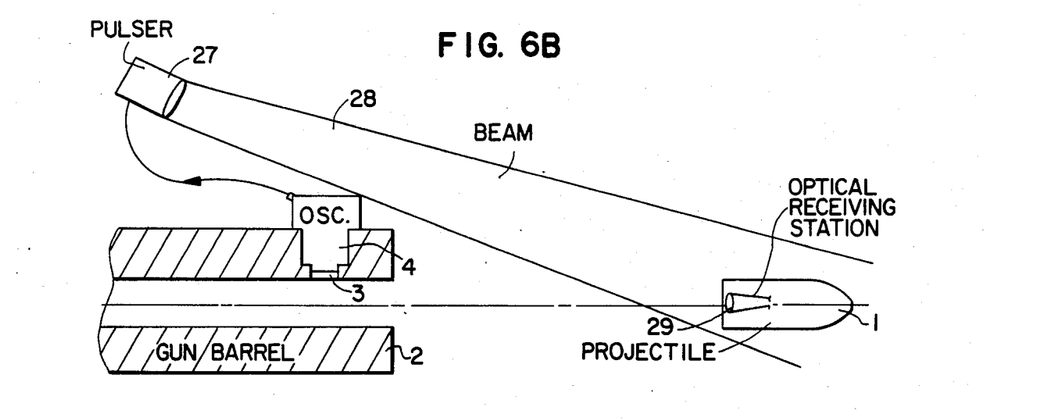

1. Prior to firing, via a cable led through the breech and the cartridge case (known method);

2. prior to firing, by induction, with the use of RF directly transmitted to the projectile, with the MV probe inside the projectile being used as a receiving sytem as in FIG. 5A; this involves grooves 24 in the projectile;

3. prior to firing, optically via a fiber optic cable 30 located in a hole in the gun tube wall, with the projectile being equipped with an optical receiving system 25 (FIG. 5B);

4. after firing, on the trajectory via radio with an antenna 26 as in FIG. 6A;

5. after firing, on the trajectory via an optronic transceiver system (FIG. 6B) using a pulser 27 with the beam 28 being collected by an optical receiving system 29 located inside the projectile 1.

Figure 7:
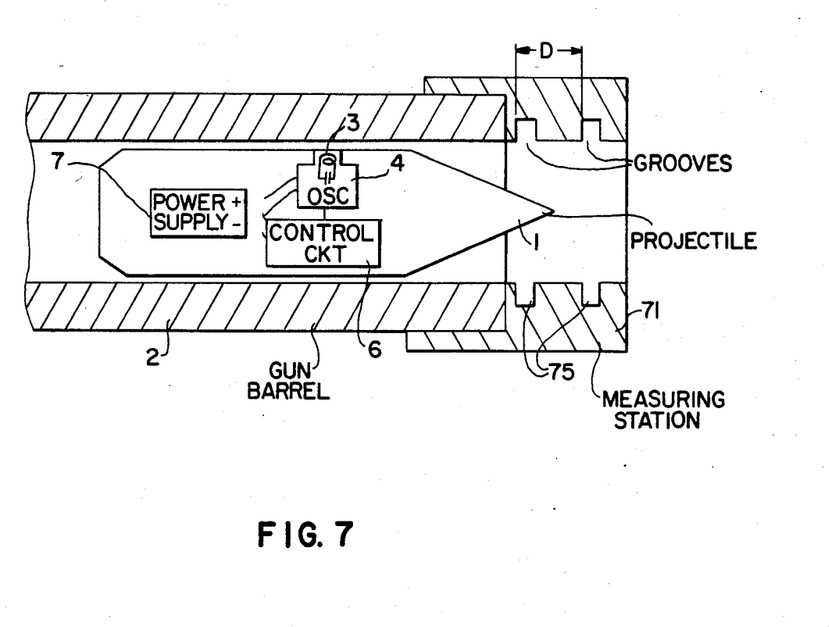
FIGS. 7, 8, and 9 illustrate further embodiments of the invention using removable measuring stations.

FIG. 7 illustrates a measuring station 71 screwed to the end of the gun barrel 2. Here, as in FIG. 1, grooves 75 corresponding to the grooves 5 of FIG. 1 produce changes in the oscillator frequency. These changes are processed the same manner as in FIG. 1. The station 71 is removable after wear has made it unusable and replaceable with another station 71.

Figure 8:
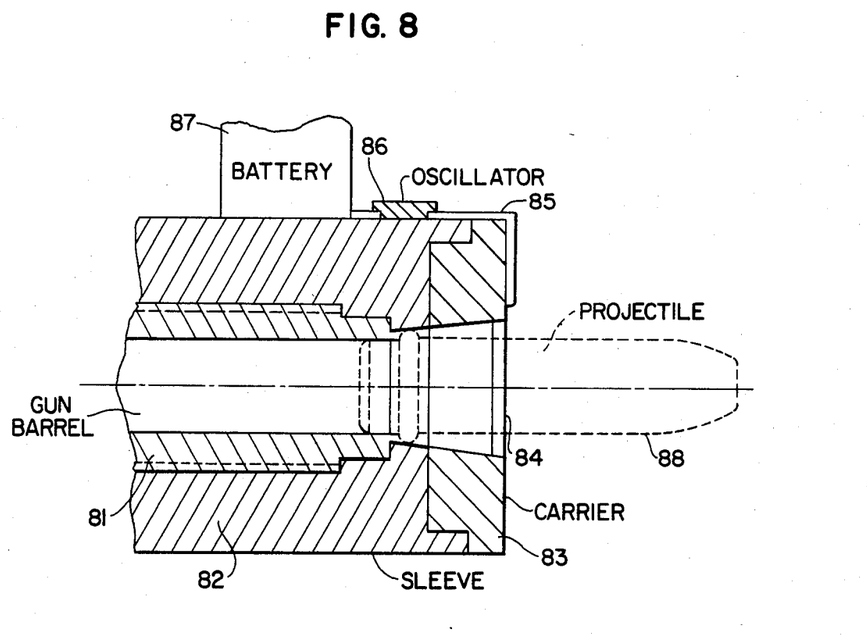
Figure 9:
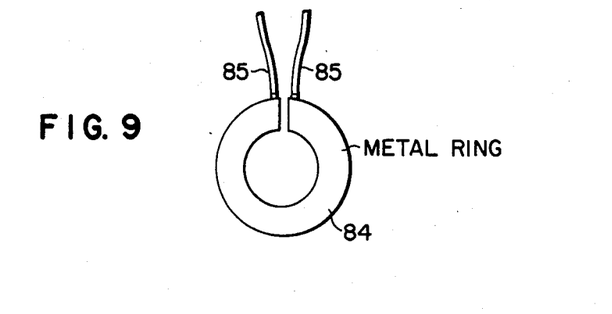

According to another embodiment of the invention, the muzzle velocity is measured by the device shown in FIG. 8 which corresponds to that in the aforementioned German patent specification DE-OS 20 23 938. Here, the muzzle of a gun barrel 81 has a metal sleeve 82 mounted thereon such as by means of threads. An insulated circular carrier 83 mounted on the sleeve holds a metallic ring 84. A conductor 85 connects the metallic ring to a transistor oscillator 86. A battery 87 which may be 6 volts or 12 volts energizes the oscillator.

The projectile 88 shown by dotted lines and passing through the metal ring produces changes in a receiver (not shown) connected to the oscillator 86.

In the example shown the oscillator 86 has an oscillator circuit inductance that produces a frequency stabilized oscillation of approximately 110 mHz. When the projectile emerges from the muzzle and passes through the ring 84, the projectile is coupled to the ring and raises the frequency of the oscillator. The magnitude of the frequency change depends upon the diameter ratio of the ring 84 and projectile 88.

The passage of the projectile through the slit ring 84 produces a change in frequency and amplitude which can be used to determine the muzzle velocity of the projectile. Further details are available from the aforementioned German Patent Publication DE-OS 20 23938.

In FIG. 4 the programmable divider 12 is programmed in bit parallel fashion by a 16 bit word. This 16 bit word is transferred to the divider by a 16 bit shift register. The shift register is set with a 16 bit word by the fire control system via a programming interface.

The control orders for the counter 9 and the switch 14 in FIG. 4, such as count-up pulses along line 18 and switch control line 19, are derived from measuring pulses 15 within the control logic 11.

While embodiments of the invention have been described in detail it will be evident to those skilled in the art that the invention may be embodied otherwise without departing from its spirit and scope.

What is claimed is:

1. Method setting the operating time of a time fuze in a projectile to be fired from a gun barrel, characterized by measuring the muzzle velocity of the projectile, and correcting the time setting on the basis of the muzzle velocity measured at a measuring station, the velocity being measured by measuring means in one of projectile and barrel relative to annular groove means on the other of said projectile and barrel.

2. A method as in claim 1, wherein said velocity is measured by said measuring means relative to a single annular groove in the gun barrel.

3. A method as in claim 1, wherein said velocity is measured by said measuring means relative to two annular grooves in the gun barrel.

4. Method as claimed in claim 1, characterized by the muzzle velocity being measured by the measuring means inside the projectile.

5. Method as claimed in claim 4, characterized by the muzzle velocity being measured by the measuring means with the use of an oscillator, the frequency of which is detuned by the projectile flying past the measuring station located inside or in front of the gun barrel.

6. Method as claimed in claims 1 or 4, characterized by the use of a bidirectional counter in combination with an adjustable frequency divider to measure the muzzle velocity and correct the time setting.

7. Method as claimed in claim 1, characterized by the muzzle velocity being measured by the measuring means at the gun barrel.

8. Method as claimed in claim 7, characterized by the correction being made by wireless radio frequency transmission.

9. Method as claimed in claim 7, characterized by the measured value being transmitted via optical relay connection.

10. Apparatus for setting a time fuze, in a projectile to be shot from a gun barrel, characterized by means for measuring the muzzle velocity of the projectile, a device for correcting the fuze time setting in accordance with the muzzle velocity measured, said measuring means being located on one of said projectile and gun barrel, and annular groove means on the other of said projectile and gun barrel relative to which said measuring means measures the muzzle velocity.

11. An apparatus as in claim 10, wherein the annular groove means is a single annular groove.

12. A apparatus as in claim 10, wherein the annular groove means is two annular grooves.

13. Apparatus as claimed in claim 10, characterized by the means for measuring the muzzle velocity being located inside the projectile.

14. Apparatus as claimed in claim 10, characterized by the measuring means including an oscillator located so that its frequency is detuned significantly by the projectile traveling along the gun barrel.

15. Apparatus as claimed in claim 10, characterized by the means for measuring the muzzle velocity (MV) being located at least partially at the gun barrel.

16. Apparatus as claimed in claim 15, characterized by the measuring means including an oscillator located so that its frequency is detuned significantly by the projectile traveling along the gun barrel.

* * * * *

UNITED STATES PATENT AND TRADEMARK OFFICE
CERTIFICATE OF CORRECTION

PATENT NO. : 4,664,013

DATED : May 12, 1987

INVENTOR(S) : Volker Wegner and Günter Schultze

It is certified that error appears in the above-identified patent and that said Letters Patent is hereby corrected as shown below:

In the heading of the Patent, it should read:

--[30]  Foreign Application Priority Data

March 4, 1983 [DE]  Fed. Rep. of Germany ....... 3307785

Signed and Sealed this

Twentieth Day of October, 1987

Attest:

DONALD J. QUIGG

Attesting Officer

Commissioner of Patents and Trademarks